Nov. 3, 1936.    O. WITTEL    2,059,834
APPARATUS FOR FEEDING MOTION PICTURE FILM
Filed June 30, 1932
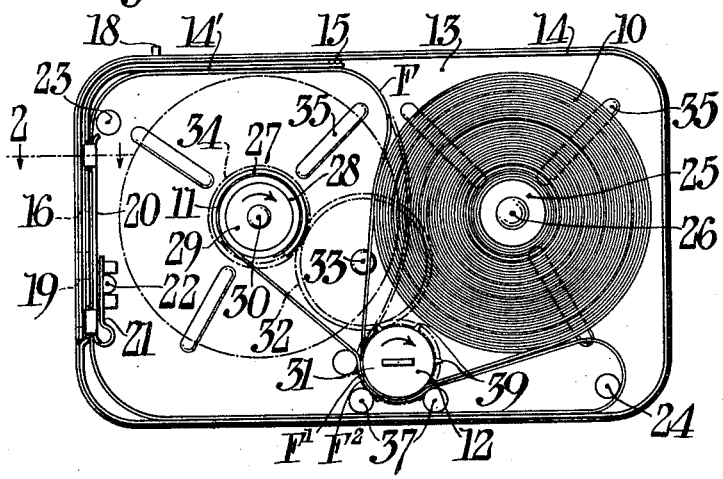
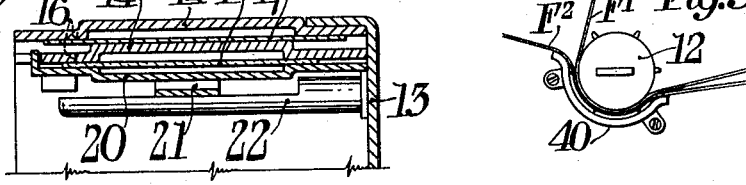
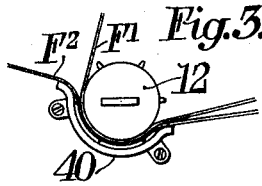
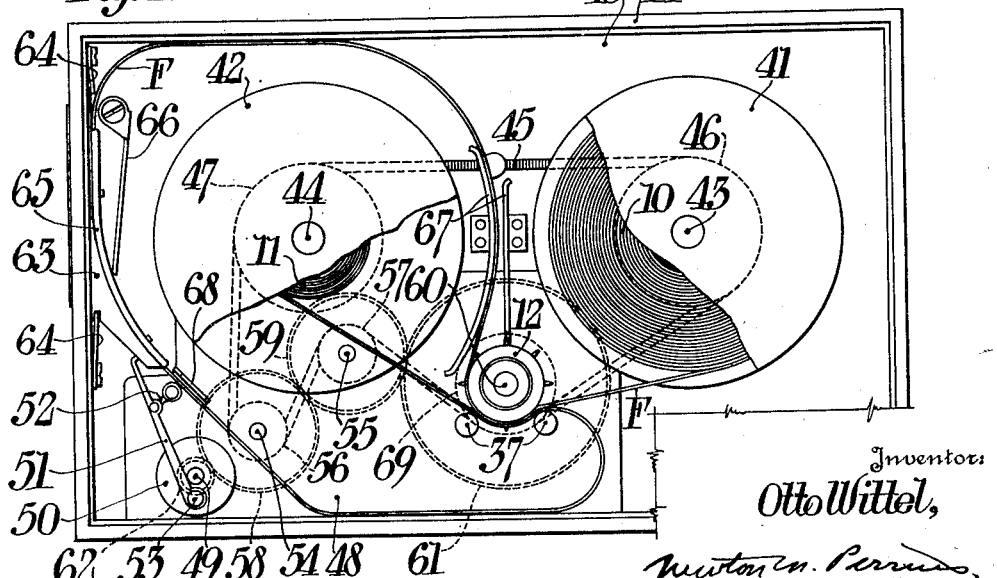
Inventor:
Otto Wittel,
By Newton N. Perrins
George A. Gillette, Jr.
Attorneys Patented Nov. 3, 1936

2,059,834

UNITED STATES PATENT OFFICE 2,059,834

APPARATUS FOR FEEDING MOTION PICTURE FILM

Otto Wittel, Rochester, N. Y., assignor, by mesne assignments, to Eastman Kodak Company, Jersey City, N. J., a corporation of New Jersey Application June 30, 1932, Serial No. 620,176

11 Claims. (Cl. 88—17)

The present invention relates to a method of feeding film through a motion picture apparatus and more particularly to the path for film through a film magazine.

The primary object of the present invention is the provision of a method for attaining the greatest compactness in a film magazine to be used in a small hand camera.

In all cine apparatus through which film is fed by an intermittent mechanism it is desirable to provide loops between the supply and take-up reels and the pull down, and the space taken up by such loops has imposed limitations on the design of the apparatus which are particularly severe in the smallest types of cameras using double reel magazines. While some magazines have omitted loops entirely, the operation puts a strain on the film and smooth operation is difficult to obtain. If the loops are within the magazine they take up space and increase the size of the magazine, and if the loops are formed outside of the magazine, the camera body must have the size to accommodate them.

Basically, the invention comprises the formation of a loop in film passing from one film roll to another so that the loop encircles one of the film rolls. When the film is conducted through a film magazine according to the invention, the compactness obtained by forming the film loop around one of the film rolls is of paramount importance, inasmuch as a magazine containing the film rolls and film loop can be provided and will be only slightly larger than a simple magazine containing only the film rolls, whereas the magazine according to the invention contains also the film loop. The formation of the film loop within the magazine is essential to that type of magazine which exposes the film within a gate located in the side of the magazine, but heretofore such formation of the loop within the magazine has resulted in a material increase in its dimensions or else has necessitated the use of loop-forming means or their equivalent which are not reliable under all conditions of operation.

Reference is hereby made to the accompanying drawing in the several figures of which like reference numerals designate similar elements and in which:

Fig. 1 is a side elevation of the preferred form of magazine according to the invention, the magazine cover having been removed to clearly show the internal elements.

Fig. 2 is a transverse cross-section through the front wall of the magazine taken on the line 2—2 of Fig. 1.

Fig. 3 is a detail view of a modified guide means for the magazine.

Fig. 4 is a side elevation of a slightly modified form of magazine according to the invention.

In all forms of the invention, a pair of film rolls 10 and 11 are rotatably mounted and the film moved between these rolls is engaged at two spaced portions thereof to form in the film a loop which encircles one of the film rolls. The means which engages the film and which forms the loop in the film may comprise a sprocket 12 also rotatably mounted within the magazine and driven in a known manner from the exterior of the magazine. According to the invention, the path of the film is as follows: From the film roll 10 in the layer $F^1$ around sprocket 12, in a loop encircling film roll 11, again around sprocket 12 in a layer $F^2$ in superposed relation to portion $F^1$ of the film already engaged by the sprocket, and thence to the other film roll 11.

The side face 13 of the magazine has a wall 14 extending around the edges thereof. The wall 14, see Fig. 1, is continued by an overlapping portion 14' which is held in spaced relation to wall 14 by a spacer 15. An aperture 16 is cut through wall 14 and portion 14' to form the exposure opening for the magazine. A flexible shutter 17, see Fig. 2, is slidably mounted between wall 14 and overlapping portion 14', being movable from the exterior of the magazine by a pin 18. An elongated slot 19 is also provided in the wall 14 and portion 14' of the magazine and is adapted to permit the entrance of a pull-down claw for advancement of the film past aperture 16. The flexible shutter 17, in closed position, is also adapted to cover elongated slot 19. A gate member 20 is located at the front of the magazine and is adapted to resiliently engage the film F to hold it in a flat plane opposite gate aperture 16 and against overlapping portion 14'. Gate member 20 is resiliently urged against the film by a tongue 21 which abuts the flat side of a post 22 mounted on the side face 13 of the magazine. A post 23 and a post 24 are affixed to side face 13 in diagonally opposite corners of the magazine for guidance of the film in the loop. The path of the film through the loop will now be specifically outlined; from the sprocket 12, along the outer convolution of film on one of the film rolls, over post 23, between overlapping portion 14' and gate member 20, along the bottom wall of the magazine, around post 24 and in a second layer $F^2$ around sprocket 12.

Film roll 10 is provided upon a film core 25 rotatably mounted on a spindle 26 attached to side face 13. The outer end of the film is attached by a clip 27 to a cylinder 28 frictionally engaging the core 29 rotatably mounted on spindle 30. The frictional engagement between cylinder 28 and core 29 is such that the cylinder 28 will be rotated by core 29 until the resistance to such rotation becomes so great that the frictional engagement is overcome and core 29 will slip within cylinder 28.

A pinion 31 is attached to sprocket 12 and drives an idle gear 32 which is rotatably mounted upon the side face 13 of the magazine by a stud 33. A pinion gear 34 is attached to core 29 and meshes with idle gear 32. Thus, when sprocket 12 is rotated in the direction indicated by the arrow, idle gear 32 will drive pinion gear 34 to rotate core 29 in the direction of the arrow thereon. The ratio of the gear train including pinion 31, idle gear 32 and pinion gear 34 is such that core 29 will tend to turn the periphery of cylinder 28 faster than film passes over sprocket 12; this is to insure proper take up of the film. However, the frictional engagement between core 29 and cylinder 28 will permit slip therebetween and will govern the tension in the film between sprocket 12 and film roll 11.

A plurality of elongated embossings 35 are struck up from side face 13 and guide the edges of the film in film rolls 10 and 11 to provide sufficient space for gear 31, 32 and 34.

A plurality of guide studs 37 are located around one side of sprocket 12 which has a plurality of teeth 39 extending from its periphery. The guide studs 37 are concentrically located with respect to sprocket 12 and are spaced from the periphery of sprocket 12 a distance of at least two film thicknesses. Guide studs 37 are shorter than the distance from side face 13 to the circumferential row of teeth 39 on sprocket 12 so that the film may be more easily threaded around sprocket 12.

When the magazine is first loaded with film, the diameters of the film rolls will be substantially those illustrated in Fig. 1 and the path of the film F through the loop will approximate that indicated by the solid lines in Fig. 1. However, after all of the film in the magazine has been exposed and wound upon cylinder 28 to form the film roll 11 of a circumference indicated by the dash-dot line of Fig. 1, then the path of the film through the loop will be altered to approximate that also indicated by dash-dot lines in Fig. 1. It should be noted that the amount of film in the loop is considerably increased by conducting the film toward the rear of the magazine and around post 24.

The guide studs 37 may be replaced by an arcuate guide plate 40, see Fig. 3, which is also concentric with the periphery of sprocket 12 and which is located at a distance of at least two film thicknesses therefrom. As before, the two spaced portions of the film are conducted in superposed relation around one side of sprocket 12 to form in the film a loop which encircles one of the film rolls.

Referring now to the modification shown in Fig. 4, the film magazine, as in the preferred form, has a side face 13 and wall 14 extending around the edge thereof. The film roll 10 and the film roll 11 are carried on film reels 41 and 42 which are shown with broken flanges for better illustration of the film path. The film reel 41 is detachably mounted on a spindle 43, while the film reel 42 is detachably mounted upon a spindle 44. The spindle 43 may be driven by a spring belt 45 through a one-way clutch 46 while spindle 44 may be driven in the opposite rotational direction through a one-way clutch 47 by spring belt 45. However, while one of the one-way clutches is operative to drive its respective spindle, the other one-way clutch is inoperative so that the spindle associated therewith is not driven and remains stationary.

A mechanism plate 48 is mounted upon and spaced from the side face 13 of the magazine. A shaft 49 is rotatably mounted in mechanism plate 48 and the side face 13 of the magazine, being driven from the exterior of the magazine. A drum 50 is mounted upon shaft 49 and drives a pulldown claw 51 which is intermediately pivoted to mechanism plate 48 by a link 52 and which is eccentrically pivoted to drum 50 by a pin 53. Shafts 54 and 55, between the mechanism plate 48 and the side face 13 of the magazine, support pulleys 56 and 57, and gears 58 and 59, respectively. The spring belt 45 in the remainder of its endless path extends around pulleys 56, 57, and pulley 69 which is mounted upon a shaft 60. The shaft 60 also supports the sprocket 12 and also a large pinion gear 61. A small gear 62 on shaft 49 drives gear 58 and in turn gears 59 and 61 so that the one-way clutches 46 and 47 are rotated in a direction corresponding to the rotational direction of shaft 49 and sprocket 12 is rotated in a corresponding direction. The gear ratio between gears 61, 59 and 58 is such that either spindle 43 or 44 is rotated to wind film upon its respective film reel at a rate which exceeds the rate at which film passes around sprocket 12. As the diameter of the take-up film increases, the spring belt 45 will slip over pulleys 56, 57 and 69 so that excessive tension is not created in the film going to the take-up roll. However, there is sufficient frictional engagement between spring belt 45 and pulleys 56, 57 and 69 to keep the film moving to the take-up sufficiently taut for proper winding of film upon either film reel 41 or 42.

A floating gate member 63 is resiliently mounted in the front wall of the magazine by means of a pair of plate springs 64. A presser member 65 is resiliently held against gate member 63 by a spring-pressed arm 66.

A pair of guide studs 37 are located around one side of sprocket 12 and are spaced at a distance of at least two film thicknesses from the periphery of the sprocket, as described with respect to Fig. 1. Another guide means is provided between film reels 41 and 42 for conducting a single layer of the film F through the loop. This guide means is preferably composed of a pair of plates 67 mounted on the side face 13 of the magazine and conducting the film in the path indicated by the solid line in Fig. 4.

The path of the film through this modified form of magazine will now be specifically outlined. The film extends from the film roll 10 on film reel 41, around the sprocket 12, in a loop between plates 67, between the floating gate member 63 and presser member 65, under guide shoe 68, again around sprocket 12, and to the film roll 11 on film reel 42. It will be noted that the guide means comprised of studs 37 assists in maintaining the engagement between sprocket 12 and the two spaced portions of film which pass in superposed relation around sprocket 12. The film is moved intermittently through the loop in a known manner by the pulldown claw 51. It should be noted that film may be effectively moved in either direction through the magazine and the direction of movement depends entirely upon the rotational direction of shaft 49 which is driven, as before stated, by an external prime mover in a known manner.

Since many modifications of the forms of film magazine described herein may be developed without exceeding the scope of the invention, the present disclosure is to be construed in an illustrative and not in a limiting sense, the particular scope of the invention being defined in the appended claims.

Having now particularly described my invention what I desire to secure by Letters Patent of the United States, and what I claim is:

1. In a film magazine, the combination with a casing adapted to contain a film strip having a portion wound on a film roll, and a film moving means within said casing for maintaining a preformed film loop within said casing, of a guide means for conducting spaced portions of said film strip in superposed relation with respect to said film moving means and to maintain a film loop which encircles said film roll.

2. In a film magazine, the combination with a casing adapted to contain a pair of film rolls, a length of film extending from one film roll to the other film roll, and a film moving means for engaging said length of film and for maintaining a preformed loop therein, of a guide means directing the length of film in a double layer in engagement with said film moving means to form said film loop which encircles one of said film rolls.

3. In a film magazine, the combination with a casing having an edge wall provided with an opening and adapted to contain a pair of film rolls with a length of film extending therebetween, a presser member adjacent said opening to form a film gate, and a film moving means for maintaining a preformed film loop in said length of film, of a guide means for directing said film loop through said film gate and loosely to encircle one of said film rolls.

4. A motion picture film magazine comprising a casing, two film rolls within said casing, a sprocket in said casing for feeding film from one film roll to the other, and guide means for directing film past said sprocket and in a loose loop completely encircling one film roll and past the sprocket again to the encircled film roll.

5. A motion picture film magazine comprising a casing, two cores within said casing, a sprocket, a perforated strip of film engaged at its ends with said cores and passing twice in driving contact with said sprocket, and a guide means directing the film included between the points of contact passing in a loose loop around one of the cores and the film wound thereon.

6. A film magazine containing a film strip provided with perforations and adapted to be conducted from one film roll to another film roll and containing a sprocket having teeth on the periphery thereof for engagement with the film perforations, characterized by a guide means spaced at a distance of at least two film thicknesses from the periphery of said sprocket for conducting longitudinally spaced portions of the film strip in superposition around one side of said sprocket to form a loop which encircles one of said film rolls.

7. A film magazine containing a film strip provided with perforations and adapted to be conducted from one film roll to another film roll and containing a sprocket having teeth on the periphery thereof for engagement with the film perforations, characterized by a plurality of guide studs spaced around one side of the sprocket and spaced at a distance of at least two film thicknesses from the periphery of said sprocket for conducting longitudinally spaced portions of the film strip in superposition around one side of said sprocket to form a loop which encircles one of said film rolls.

8. In a film magazine, the combination with a casing adapted to contain a film roll, and a means within said casing for maintaining a preformed film loop within said casing, of a guide means for conducting spaced portions of the film in superposed relation around said means for maintaining a loop in the film, and a second guide means located between said film roll and said film loop and for conducting the single layer of film in the film loop around said film roll.

9. A film magazine containing a film strip provided with perforations and adapted to be moved from one film roll to another film roll, and containing a sprocket having teeth on the periphery thereof for engagement with the film perforations, characterized by an arcuate guide plate concentrically located with respect to said sprocket and spaced a distance of at least two film thicknesses from the periphery of said cylinder and for conducting spaced portions of the film in superposed relation around one side of said sprocket to form a loop which encircles one of said film rolls.

10. A film magazine containing a pair of film rolls and a means for maintaining a preformed loop in the film in its path from one film roll to the other film roll, a guide means for conducting two spaced portions of the film in superposed relation around said means for maintaining a loop in the film, and a second guide means located between said film rolls for conducting a single layer of film in the loop between said film rolls.

11. A motion picture film magazine comprising a casing, two film rolls within said casing, a sprocket, an exposure gate in the casing, and a perforated strip of film engaged at its ends with said cores and passing twice in driving contact with said sprocket, and a guide means conducting the strip of film between the points of contact in a loose loop around one of the cores and at the gate.

OTTO WITTEL.